Patented July 11, 1950

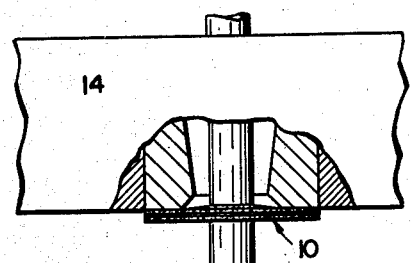
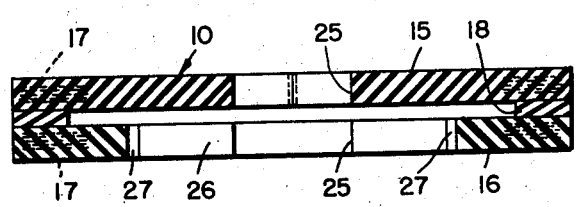
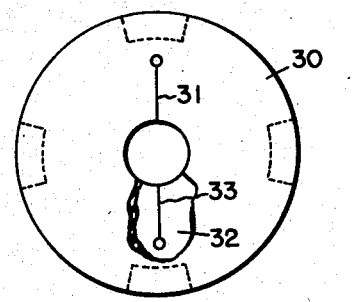
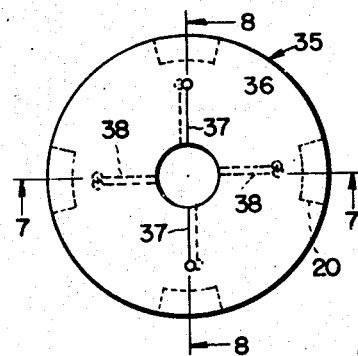
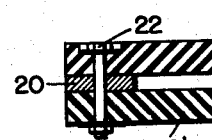
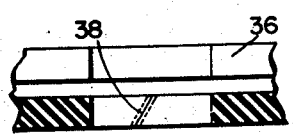
INVENTORS
RAY O. WHEATON
WILLIAM H. WILDE
BY
ATTORNEYS.

2,514,817

UNITED STATES PATENT OFFICE 2,514,817

DEVICE FOR WIPING MUD AND THE LIKE FROM PIPES

Ray O. Wheaton and William H. Wilde, Avenal, Calif., assignors to Byron H. Barnes and Harriet C. Barnes, both of San Marino, Calif.

Application February 18, 1947, Serial No. 729,320

9 Claims. (Cl. 15—210)

1

This invention relates to devices used for removing mud or drilling fluid from drill pipe as the pipe is withdrawn from a well.

Various types of wipers are used for removing the drilling fluid from the pipe. Such devices are usually in the form of a disk of rubber, or other flexible material, having a central opening through which the pipe is pulled. Since the hole in the wiper must necessarily be slightly smaller than the external diameter of the pipe to be wiped in order for the wiper to efficiently remove the fluid from the pipe, the wiper offers considerable resistance to the passage of enlargements on the pipe, such as tool joints, and as a result the wipers are often torn as enlargements on the pipe are drawn through them. We are aware that pipe wipers embodying a plurality of tongues which are formed by slits extending outwardly from the opening through the wiper have been used, but to the best of our knowledge this type of wiper is ineffective to remove all the drilling fluid from the pipe, the wiper having a tendency to leave streaks of the fluid on the pipe.

It is, therefore, an object of this invention to provide a novel wiper of simple construction which will efficiently wipe the pipe as it is drawn therethrough, yet will permit of the passage of enlargements on the pipe, such as tool joints and the like, without damage to the wiper.

It is a particular object to provide in effect a dual wiping device embodying a pair of spaced apertured flexible disks, each of which is slit outwardly from the aperture therethrough in one or more places, the slits in one disk being staggered relative to those in the other.

These and other objects will be aparent from the drawing and the following description thereof. Referring to the drawing, which is for illustrative purposes only:

Fig. 1 is an elevational view, partly in section, showing the wiper on a drill pipe in association with the rotary table and a well;

Fig. 2 is a vertical sectional view of a form of wiper embodying the invention;

Fig. 3 is a plan view, partly broken away, of the device of Fig. 2;

Fig. 4 is a fragmentary sectional view of a means for securing parts of the wiper together;

Fig. 5 is a plan view of a slightly modified form of the invention;

Fig. 6 is a plan view of another modified form of the invention;

Fig. 7 is a fragmentary enlarged sectional view on line 7—7 of Fig. 6; and

2

Fig. 8 is an enlarged fragmentary sectional view on the line 8—8 of Fig. 6.

More particularly describing the invention, reference numeral 10 generally indicates a wiper which is shown in position on a drill pipe 11 extending from the well 12 and upwardly through a rotary table 14. The wiper is in the position it would normally occupy as the pipe is withdrawn from the well, the upper surface of the wiper abutting against the under surface of the rotary table.

Referring particularly to Figs. 2 and 3, the wiper 10 comprises a pair of disks indicated by numerals 15 and 16. These disks may be formed of a rubber composition or any material having the flexible and resilient qualities characteristic of rubber. Preferably each disk is made stiffer in the region of the periphery than inwardly thereof. This may be done either by curing the rubber to produce a harder rubber near the periphery, or by incorporating suitable reinforcing means in this region, or by both. In Fig. 2 fabric reinforcing means 17 has been shown incorporated in the disks.

The two disks are mounted in spaced relation to each other, as shown, by means of suitable spacer and holding means. In the form of the invention shown in Figs. 2 and 3, spacer elements 18 formed of rubber are located at spaced intervals about the peripheral areas of the two disks and between the two. The elements are cemented or vulcanized to the disks. It is contemplated that these spacer elements may be formed as a part of either disk and cemented or vulcanized to the other disk, or that the entire wiper may be molded as a single unit. The spacer elements need not necessarily be rubber, but may be of any relatively strong material, and bolts or other securing means may be utilized for securing the parts together. For example, in Fig. 4, disks 15' and 16' are shown spaced apart by a metal spacer element 20, with nut and bolt means 22 serving to hold the parts together.

The disks are centrally apertured at 25 to provide an opening for the pipe to be wiped. The apertures or holes 25 are preferably of slightly less diameter than the outer diameter of the pipe to be wiped. To prevent the disks from tearing when enlargements on the pipe, such as the tool joint 11' fragmentarily shown in Fig. 1, are pulled therethrough, each disk is provided with one or more slits 26. These slits extend outwardly from the openings partway to the periphery of the disk, and in the form of the invention shown in Figs. 2 and 3, each disk has two radially extending slits, one on each side of the hole. To preclude tearing of the rubber beyond the ends of the slits, it is desirable to provide holes 27 at the end of each slit.

The disks are so arranged that the two slots of one disk are staggered relative to the slits in the other disk, as shown in Fig. 3, where the slits in one disk are at right angles to those in the other. With this construction, as the pipe is pulled up through the disks, any drilling fluid which is not removed from the pipe by the lower disk 16 in the region of the slits 26 thereof, will be removed by the unslitted portion of the upper disk lying immediately above these slits.

The two disks are spaced sufficiently far apart to permit of the escape of mud or drilling fluid removed by the pipe by the upper disk to a point externally of the wiper. We have found that if the two disks are spaced apart by too great a distance, while there is ample room for the mud to escape toward the periphery of the disks, the mud in some wells has a tendency to build up on the under surface of the upper disk in the region adjacent the pipe being wiped and migrate around on the under surface of the upper disk until it reaches the slits thereof with the result that the mud may tend to flow through the slits of the upper disk leaving a pair of streaks of mud on the pipe. To prevent this, it is desirable that the two disks be fairly closely spaced so that as the lower disk is deflected upwardly by the action of the upward moving pipe therethrough, the slit portions of the lower disk adjacent the slits will contact the upper disk acting as walls to form, with the upper disk, a substantially radial channel at each slit for conducting away material left on the pipe by the slit portion of the lower disk and removed by the upper disk. This prevents lateral migration of the mud around the inner portion of the lower surface of the upper disk in the manner previously described. In this connection it may be pointed out that, theoretically, the only mud remaining on the pipe after it has passed the lower disk is such mud as passes through the slit portions of the lower disk. The correct spacing of the disks to achieve maximum removal of fluid depends upon various factors, such as the thickness of the disks, the relative flexibility thereof, the number of slits therein and the sizes of the disks. However, the spacing should be less than the length of the individual slits in the lower disk.

In Fig. 5 there is shown a slightly modified form of the invention wherein each disk is provided with a single slit. The upper disk 30 has a radial slit 31 and the lower disk 32 has a corresponding slit 33. These slits are preferably positioned on opposite sides of the wiper in order to insure that any material left on the pipe by the lower disk will be removed by the unslitted portion of the upper disk.

In Figs. 6–8 there is shown a form of the invention which is generally similar to that shown in Figs. 2 and 3, but differs therefrom in that the wiper indicated by 35 is provided with inclined slits. More specifically the upper disk 36 is provided with a pair of oppositely disposed inclined slits 37 and the lower disk with a similar pair of inclined slits 38 located at right angles to the slits in the upper disk. With this construction, there is less chance for the slit portions of the wiper disks to leave any drilling fluid on the pipe as the same is pulled through the wiper.

We claim:

1. A pipe wiper for use in removing rotary drilling mud and the like from drill pipe as the pipe is withdrawn from a well comprising a pair of resilient disks having aligned pipe receiving openings of less diameter than the diameter of the pipe to be wiped, each disk having a radial slit extending from the opening therethrough toward the periphery of the disk for a limited distance; means holding said disks in vertically spaced relation with the slit of one disk staggered relative to the slit in the other, said means occupying a limited area only of the opposed faces of said disks at spaced regions about the periphery thereof, said spacing of said disks being less than the length of the slit in the lower disk, whereby, when a pipe is being pulled upwardly through said disks, to enable that portion of the top of said lower disk adjacent the slit in the lower disk to engage the under surface of said upper disk and thereby form with the upper disk a substantially radial channel for conveying away material left on the pipe by the slit portion of the lower disk and removed from the pipe by the upper disk.

2. A pipe for use in removing rotary drilling mud and the like from drill pipe as the pipe is withdrawn from a well comprising, a pair of flexible, rubber, disk-like members having aligned pipe receiving openings of less diameter than the diameter of the pipe to be wiped, each member having a slit extending from the opening therethrough toward the periphery of the disk; means holding the members in vertically spaced relation with the other, said spacing of said members being less than the length of the slit in the lower member, whereby, when a pipe is being pulled upwardly through said members, to enable that portion of the top of said lower member adjacent the slit in the lower member to engage the under surface of said upper member and thereby form therewith a substantially radial channel for conveying away from said pipe material left on the pipe by the slit portion of the lower member and removed from the pipe by the upper member.

3. A pipe wiper for use in removing rotary mud and the like from drill pipe as the pipe is withdrawn from a well comprising, a pair of flexible rubber disk-like members having aligned pipe receiving openings, each member having a slit extending from the opening therethrough toward the periphery of the member, the slit in one member being staggered relative to the slit in the other, and means secured to said members at spaced regions about the peripheries of the members for holding the same in spaced relation, said means comprising spacer elements between said members and securing elements passing through said members and said spacer elements.

4. A pipe wiper for use in removing rotary drilling mud and the like from drill pipe as the pipe is withdrawn from a well comprising, a pair of flexible, resilient, disk-like members supported solely by the pipe to be wiped and having aligned pipe receiving openings of less diameter than the diameter of the pipe to be wiped, each member having a slit extending from the opening therethrough toward the periphery of the disk; means holding the members in vertically spaced relation with the slit of one member staggered relative to the slit in the other, said spacing of said members being less than the length of the slit in the lower member.

5. A pipe wiper for use in removing rotary drilling mud and the like from drill pipe as the pipe is withdrawn from a well comprising a pair of flexible non-metallic disk-like members having aligned pipe receiving openings of less diameter than the diameter of the pipe to be wiped, each member having a slit extending from the opening therethrough toward the periphery of the disk; means holding the members in vertically spaced relation with the slit of one member staggered relative to the slit in the other, said spacing of said members being less than the length of the slit in the lower member, whereby, when a pipe is being pulled upwardly through said members, to enable that portion of the top of said lower member adjacent the slit in the lower member to engage the under surface of said upper member and thereby form therewith a substantially radial channel for conveying away from said pipe material left on the pipe by the slit portion of the lower member and removed from the pipe by the upper member.

6. A pipe wiper for use in removing rotary drilling mud and the like from drill pipe as the pipe is withdrawn from a well comprising a pair of flexible, resilient, disk-like members adapted to be supported solely by the pipe to be wiped and having aligned pipe receiving openings of less diameter than the diameter of the pipe to be wiped, each member having a slit extending from the opening therethrough toward the periphery of the disk; means holding the members in vertically spaced relation with the slit of one member staggered relative to the slit in the other, said spacing of said members being less than the length of the slit in the lower member.

7. A pipe wiper for use in removing rotary drilling mud and the like from drill pipe as the pipe is withdrawn from a well comprising a pair of flexible, resilient, disk-like members having aligned pipe receiving openings, each of said members having a slit extending outwardly from the opening therethrough, the slit of one of said members being staggered relative to the slit in the other, and means holding said members in vertically spaced relation, said means comprising a plurality of spacer elements of limited peripheral extent disposed between the members at spaced points around the peripheries of said members, the space between said members being unobstructed from the pipe receiving openings out to and beyond the peripheries of the members except in the region of said spacer elements whereby mud removed from the pipe in said space may freely flow radially out from between said members.

8. A device for wiping mud from a pipe comprising a body having a resilient central portion having an axial hole therethrough not larger in diameter than the diameter of the pipe to be wiped; having, between the ends of said hole, an annular mud receiving recess around said hole and having a mud outlet opening communicating with said recess; that part of the central portion of the body at one end of the hole having a slit extending radially outwardly from said hole and that part of the central portion of the body at the other end of the hole having a slit extending radially outwardly from said hole; said slits being circumferentially offset from each other.

9. In a device for wiping mud from a well drilling pipe while the pipe is being moved axially from a well, a hollow flexible body whose interior provides a mud receiving chamber, said body having an axial pipe passing hole therethrough of the cross-sectional shape of, and of less diameter than that of the pipe being wiped, whereby to constrict about the pipe in conforming relation therewith, and having a slit in each end which intersects and extends radially outwardly from said hole for a limited distance, short of the periphery of the body whereby to permit an enlarged drill pipe joint to be pulled through said hole without damaging said body.

RAY O. WHEATON.
WILLIAM H. WILDE.

REFERENCES CITED

The following references are of record in the file of this patent:

UNITED STATES PATENTS

| Number | Name | Date |
|---|---|---|
| 204,625 | Silsbee | June 4, 1878 |
| 1,576,327 | Hughes | Mar. 9, 1926 |
| 1,840,334 | Schuster | Jan. 12, 1932 |
| 1,868,794 | Fuller et al. | July 26, 1932 |
| 2,029,855 | Chambers | Feb. 4, 1936 |
| 2,125,742 | Sundhauss | Aug. 2, 1938 |
| 2,215,377 | Penfield et al. | Sept. 17, 1940 |
| 2,255,829 | Spang et al. | Sept. 16, 1941 |
| 2,272,395 | Ballagh | Feb. 10, 1942 |
| 2,328,127 | Crickmer | Aug. 31, 1943 |

FOREIGN PATENTS

| Number | Country | Date |
|---|---|---|
| 554,331 | Great Britain | June 29, 1943 |